United States Patent
Lawes et al.

(10) Patent No.: US 10,469,810 B2
(45) Date of Patent: Nov. 5, 2019

(54) METHOD AND SYSTEM FOR MAINTAINING A LIGHT SOURCE AT AN IDEAL LUX

(71) Applicants: Chris Lawes, Murray, UT (US); Shawn Lindberg, Salt Lake City, UT (US)

(72) Inventors: Chris Lawes, Murray, UT (US); Shawn Lindberg, Salt Lake City, UT (US)

(*) Notice: Subject to any disclaimer, the term of this patent is extended or adjusted under 35 U.S.C. 154(b) by 0 days.

(21) Appl. No.: 15/165,901

(22) Filed: May 26, 2016

(65) Prior Publication Data

US 2017/0347072 A1 Nov. 30, 2017

(51) Int. Cl.
*H04N 9/31* (2006.01)

(52) U.S. Cl.
CPC ......... *H04N 9/3155* (2013.01); *H04N 9/3147* (2013.01)

(58) Field of Classification Search
CPC ............................ H04N 9/3147; H04N 9/3155
See application file for complete search history.

(56) References Cited

U.S. PATENT DOCUMENTS

| | | | | |
|---|---|---|---|---|
| 5,493,183 A * | 2/1996 | Kimball | ............... | G09G 3/3406 315/308 |
| 5,495,329 A * | 2/1996 | Anderson, II | ..... | H04N 1/40056 356/218 |
| 6,337,541 B1 * | 1/2002 | Dickie | ................... | H05B 33/08 315/169.3 |
| 6,873,262 B2 * | 3/2005 | Midlang | ............... | F25D 27/005 315/200 R |
| 2005/0110958 A1 * | 5/2005 | Schwartz | ........... | G03B 21/2053 353/85 |
| 2008/0062070 A1 * | 3/2008 | De Oto | .............. | H05B 33/0848 345/46 |
| 2015/0097932 A1 * | 4/2015 | Lin | ........................ | G03B 21/32 348/51 |
| 2016/0269701 A1 * | 9/2016 | Guo | ..................... | H04N 9/3182 |

* cited by examiner

*Primary Examiner* — Charlie Y Peng
(74) *Attorney, Agent, or Firm* — Steven Rinehart (57) ABSTRACT

A method for maintaining a light source at an ideal lux helps maintain a lux that is generated by at least one light source at a level that is equal or greater than an ideal lux. The light source may include a digital projector. The ideal lux is necessary to view an image under optimal conditions. The method enables a calculated and incremental increase of the lux generated by the light source to achieve the ideal lux. This incremental increase is correlated to an anticipated loss of lux by the light source. By incrementally increasing the amount of lux generated, a maximum lux capacity of the light source is not used; thereby increasing the lifespan of the light source and providing the viewer with a consistent, ideal brightness image for long periods without requiring excessive replacement of bulbs or maintenance on the light source.

1 Claim, 5 Drawing Sheets

METHOD AND SYSTEM FOR MAINTAINING A LIGHT SOURCE AT AN IDEAL LUX

FIELD OF THE INVENTION

This invention relates to a method for maintaining a light source at an ideal lux and more particularly relates to a method for maintaining a light source at an ideal lux by calculating and incrementally increasing the required lux generated by the light source to compensate for anticipated loss of lux by the light source in such a manner that the maximum lux capacity of the light source is underutilized in relation to the ideal lux.

BACKGROUND

Description of the Related Art

Typically, a projector is an optical device that projects an image (or moving images) onto a surface, commonly a projection screen. Most projectors create an image by shining a light through a small transparent lens, but some newer types of projectors can project the image directly, by using lasers.

Projectors have been used widely to project an expanded image on a screen. The projectors are used under various conditions on the lightness of working environment, the focal length of a projection lens, and the projection distance. A number of techniques have been proposed to regulate the brightness and the contrast ratio of a projected image according to these parameters for optimal viewing of the projected image.

In many instances, digital projectors are projectors that can handle digital source material. Digital projectors are practical for presentations and integration with device applications on the iPod or iPhone, for picture and media enjoyment on a larger display screen. The vast majority of digital projectors are lamp based projectors weighing in from about 3 pounds to 10 pounds and offering from 2000 to 5000 lumens.

It is known that lux is a unit of light measurement that takes area into account, representing light intensity. Lux is effective for measuring the amount of light output in a given area, where one lux is equal to one lumen per square meter. Lux is a great measurement for determining what we see as the brightness of a beam. Lux also determines the magnitude of light intensity travelling over distances. Generally a light beam for a projector that is configured for high lux output will travel farther but will have a smaller footprint of light (e.g. lighthouse spotlight). A projector that emits a low lux level will be configured to travel shorter distances but have a larger footprint (e.g. decorative down lighting or ambient lighting).

Most projectors, and specifically the lamps, have a natural reduction of light intensity (lux) over time. It is known that a laser phosphor projector often decreases in brightness (loss of lux) in a much slower and more uniform way than lamp based projectors. It is also known that when using a single projector or a set of multiple projectors calibrated into a cohesive image, it is possible to use more projectors or brighter projectors than normally required and program all the projectors to operate at less than 100% capacity to achieve an ideal level of brightness. This helps compensate for the loss of lux by the laser phosphor projector.

Other proposals have involved increasing the lifespan of lamps on projectors. The problem with these techniques is that they do not compensate for the natural loss of lux by the light source. Even though the above cited techniques for enhancing lighting on projectors meet some of the needs of the market, a method for maintaining a light source at an ideal lux by calculating and incrementally increasing the required lux generated by the light source to compensate for anticipated loss of lux by the light source in such a manner that the maximum lux capacity of the light source is underutilized in relation to the ideal lux, is still desired.

SUMMARY

From the foregoing discussion, it should be apparent that a need exists for a method to maintain a light source at an ideal lux, such that an image may be viewed under optimal conditions. Beneficially, such a method would help maintain a light source at an ideal lux by calculating and incrementally increasing the required lux generated by the light source to compensate for anticipated loss of lux by the light source in such a manner that the maximum lux capacity of the light source is underutilized in relation to the ideal lux. This calculated manipulation of the lux generated by the light source helps increase the lifespan of the light source, and maintain the ideal lux for a longer period.

The present invention has been developed in response to the present state of the art, and in particular, in response to the problems and needs in the art that have not yet been fully solved by currently available projectors. Accordingly, the present invention has been developed to provide a method for maintaining a light source at an ideal lux that overcome many or all of the above-discussed shortcomings in the art.

The method for maintaining a light source at an ideal lux is configured to help maintain a lux that is generated by at least one light source at a level that is equal or greater than an ideal lux. The ideal lux, or brightness, is the minimal amount of lux necessary to view an image under optimal conditions. The method calculates and incrementally increases the lux generated by the light source to achieve a level of brightness equal or greater than the ideal lux. This incremental increase is correlated to an anticipated loss of lux by the light source. By incrementally increasing the amount of lux generated, a maximum lux capacity of the light source is not used; thereby increasing the lifespan of the light source. Further, the viewer is provided with a consistent, ideal brightness image for long periods without requiring excessive replacement of bulbs or maintenance on the light source.

The method provides at least one light source, such as a projector, that generates a lux, or brightness, up to a maximum lux capacity. The light source also comprises an anticipated loss of lux over a duration. The light source operates based on a lux adjustment algorithm. The lux adjustment algorithm derives the required incremental increases in the lux from the light source that are needed to maintain the ideal lux. The lux adjustment algorithm also compensates for the anticipated loss of lux from the light source by calculating the necessary increase of lux required by the light source to maintain the ideal lux. This incremental increase of lux occurs until the maximum lux capacity of the light source depletes less than the ideal lux. In this manner, the lifespan of the light source is increased, and the ideal lux is maintained for a longer period.

In some embodiments, the method comprises an initial Step of determining an ideal lux for viewing an image. The ideal lux is the light intensity necessary to view the image at optimal conditions. A subsequent Step comprises providing at least one light source. The light source may include a projector in a projector environment, such as a theater. The appropriate light source is identified and installed, depending on the ideal lux requirements and projector environment. One light source may be used, or multiple light sources may be coordinated to generate a desired lux.

Another Step may include configuring the at least one light source to generate a lux equal or greater than the ideal lux, whereby the light source comprises a maximum lux capacity that is greater than the ideal lux, whereby the maximum lux capacity is generally underutilized in relation to the ideal lux. In one embodiment, the light source is configured to have a maximum lux capacity that greatly exceeds the required ideal lux to view the image. The light source is underutilized in this manner; thereby increasing the lifespan of the light source. In one exemplary embodiment where the lux of the light source exceeds the ideal lux requirement by 100%, the light source can operate at 50% of the maximum lux capacity to generate lumens equaling the ideal lux. This underutilization of the light source occurs until a light generating mechanism in the light source is depleted.

A Step includes deriving a lux adjustment algorithm for operation of the at least one light source. The lux adjustment algorithm can be operated manually or through automated software. The amount of lux generated by the light source is at least partially controlled by the calculations of the lux adjustment algorithm.

In some embodiments, a Step may include calculating, by the lux adjustment algorithm, a loss of lux by the at least one light source during a duration. The light source comprises a light generating mechanism that generates the lux. Those skilled in the art will recognize that all digital imaging projectors, such as the light source decrease in image quality, especially brightness (lux), as the light generating mechanism degrades over a duration. Thus, the lux adjustment algorithm utilizes the calculated data from the anticipated loss of lux to derive necessary increases in lux for of the light source.

A Step includes calculating, by the lux adjustment algorithm, a required increase in lux by the at least one light source to compensate for the loss of lux by the at least one light source, so as to maintain the lux equal or greater than the ideal lux during the duration. As the light generating mechanism becomes depleted over the duration, the amount of lux required to maintain the ideal lux increases. This compensatory increase in lux is derived by the lux adjustment algorithm.

A final Step comprises incrementally increasing the lux of the at least one light source based on the calculations of the lux adjustment algorithm until the maximum lux capacity of the at least one light source is depleted to less than the ideal lux. The light generating mechanism may be manually or automatically operated for this purpose.

One objective of the present invention is to increase the lifespan of a light source, such as a projector.

Another objective is to manage the lux, or brightness of a projector to achieve an ideal lux for a longer period with the same light source.

Another objective is to increase the lifespan of a light source.

Yet another objective is to calculate the loss of lux by the light source over a duration.

Yet another objective is to calculate the compensatory increase in light from the light source to compensate for the loss of lux over the duration.

Yet another objective is to provide a lux adjustment algorithm that is a licensed subcomponent of existing commercial projector management solutions, or running on a dedicated computer that is networked connected to the projectors.

Yet another objective is to provide a viewer with a consistent, ideal brightness image for many years in a row without requiring excessive replacement of bulbs or maintenance on the light source Yet another objective is to offers a significantly improved viewer experience and substantial cost savings for a projector owner.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
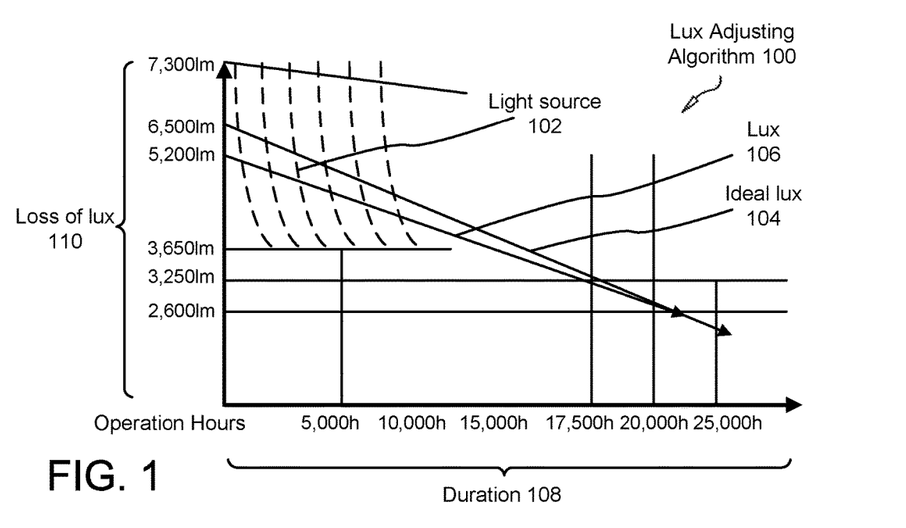
FIG. 1 is diagram of an exemplary lux adjusting algorithm used in a method for maintaining a light source at an ideal lux in accordance with the present invention.

FIG. 1 depicts a method 300 for maintaining a light source 102 at an ideal lux 104, so as to optimize viewing of an image. In some embodiments, the method 300 may be configured to manipulate a lux 106 that is generated by at least one light source 102 at a level that is equal or greater than an ideal lux 104. The ideal lux 104, or brightness, may include the minimal amount of lux necessary to view an image under optimal conditions.

The method 300 calculates and incrementally increases the lux 106 generated by the light source 102 to achieve a lux that is equal or greater than the ideal lux 104. This incremental increase of lux is correlated to an anticipated loss of lux 110 by the light source 102 over a duration. By incrementally increasing the amount of lux 106 that is generated, a maximum lux capacity of the light source 102 is not used, i.e., the light source is underutilized. This increases the lifespan of the light source 102. Further, the viewer is provided with a consistent, ideal brightness image for long periods without requiring excessive replacement of bulbs or maintenance on the light source 102.

In some embodiments, the method 300 provides at least one light source 102 that generates a lux 106 up to a maximum lux capacity. In one embodiment, the maximum lux capacity is defined as the brightest possible state of the light source 102. The light source 102 also comprises an anticipated loss of lux 110 over a duration 108. In one embodiment, the loss of lux is defined as the natural loss of brightness over time—often multiple years—which a digital projector emits.

In some embodiments, the light source 102 may include, without limitation, a digital projector, a laser-phosphor projector, a lamp, a projector engine, and an illuminating device. The light source 102 may be configured to operate in a projector environment, such as a single projector cinema theatres, multi projector planetarium, and projection mapping installations such as dark rides in theme parks or military simulation environments.

In some embodiments, a lux adjustment algorithm 100 operates the light source 102. The lux adjustment algorithm 100 calculates the required incremental increases in the lux 106 from the light source 102 that are needed to maintain the ideal lux 104. The lux adjustment algorithm 100 also compensates for an anticipated loss of lux 110 by the light source 102 through calculations. These calculations derive the necessary increase of lux 106 required by the light source 102 to maintain the ideal lux 104. This incremental increase of lux 106 occurs until the maximum lux capacity of the light source 102 depletes to a level less than the ideal lux 104. In this manner, the lifespan of the light source 102 is increased, and the ideal lux 104 is maintained for a longer period.

Figure 2:
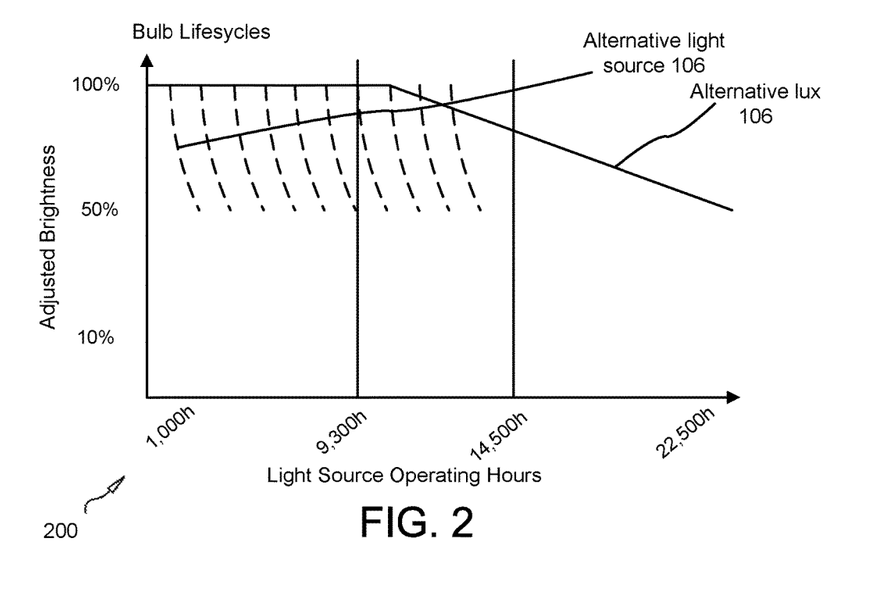
FIG. 2 is diagram of an exemplary alternative lux adjusting algorithm used in a method for maintaining a light source at an alternative ideal lux in accordance with the present invention.

FIG. 2 is diagram of an exemplary alternative lux adjusting algorithm 200 used in a method for maintaining a light source at an alternative ideal lux 202. In this alternative embodiment, the alternative lux adjusting algorithm 200 calculates and controls an alternative light source 204, which may include a single laser phosphor light. In one embodiment, the alternative light source 204 is generally replaced every five years with a service contract. The estimated lifespan of the alternative light source 204, at 5 years, with 5 hours of usage every day, 365 days a year, is 9,125 hours. This is referenced by the vertical line on the left of the diagram. However, with 8 hours of usage every day, the lifespan is 14,600, as referenced in the vertical line on the right of the diagram.

Figure 3:
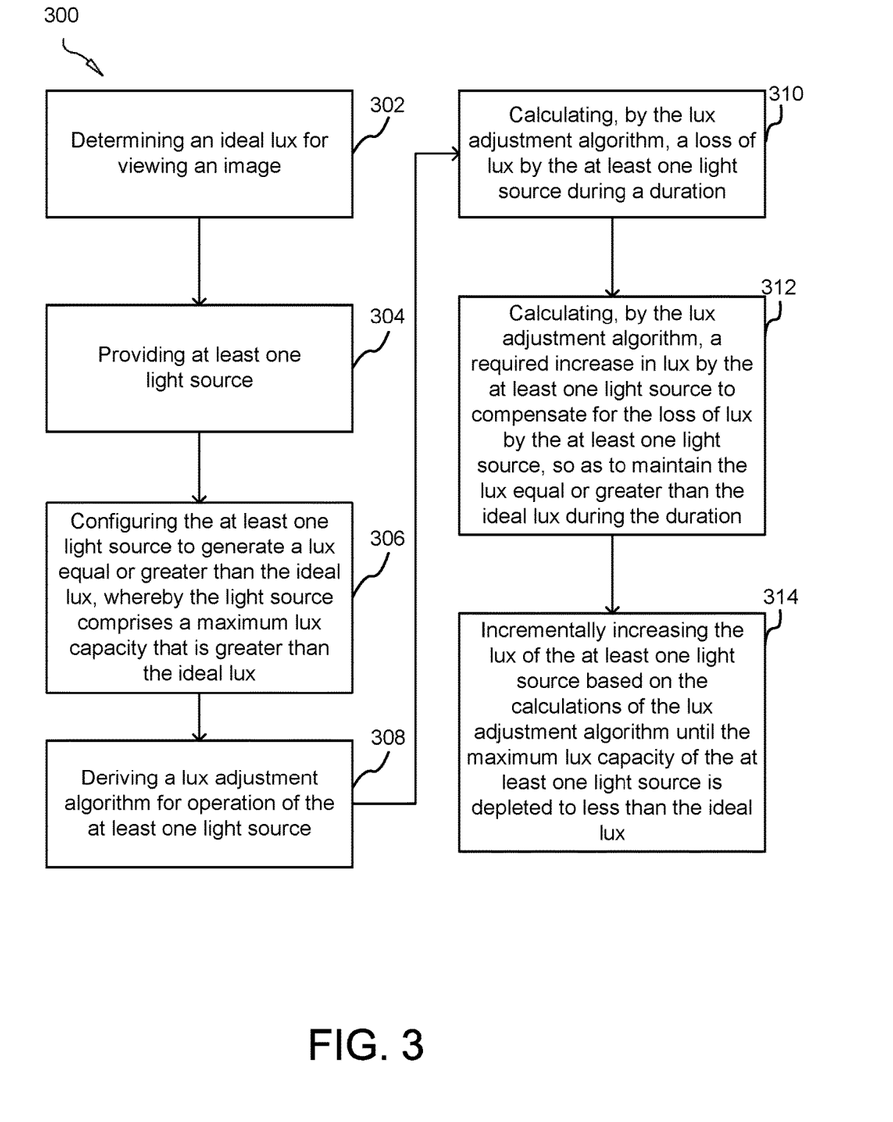
FIG. 3 illustrates a flowchart of an exemplary method for maintaining a light source at an ideal lux in accordance with the present invention.

FIG. 3 illustrates a flowchart of an exemplary method 300 for maintaining a light source at an ideal lux. The method 300 comprises an initial Step 302 of determining an ideal lux 104 for viewing an image. The ideal lux 104 is the light intensity necessary to view the image at optimal conditions. A subsequent Step 304 comprises providing at least one light source 102. The light source 102 may include a projector in a projector environment, such as a theater. The appropriate light source 102 is identified and installed, depending on the ideal lux 104 requirements and projector environment. Multiple light sources may be coordinated to generate a desired lux 106.

Another Step 306 may include configuring the at least one light source 102 to generate a lux 106 equal or greater than the ideal lux 104, whereby the light source 102 comprises a maximum lux capacity that is greater than the ideal lux 104, whereby the maximum lux capacity is generally underutilized in relation to the ideal lux 104. In one embodiment, the light source 102 is configured to have a maximum lux capacity that greatly exceeds the required ideal lux 104 to view the image.

The light source 102 is underutilized in this manner; thereby increasing the lifespan of the light source 102. In one exemplary embodiment where the lux 106 of the light source 102 exceeds the ideal lux 104 requirement by 100%, the light source 102 can operate at 50% of the maximum lux capacity to generate lumens equaling the ideal lux 104. This underutilization occurs until a light generating mechanism in the light source 102 is depleted.

A Step 308 includes deriving a lux adjustment algorithm 100 for operation of the at least one light source 102. The amount of lux 106 generated by the light source 102 is at least partially controlled by the calculations of the lux adjustment algorithm 100. In some embodiments, the lux adjustment algorithm 100 may be configured to perform calculations for controlling the light source 102, and specifically the amount of lux 106 generated by the light generating mechanism in the light source 102. The calculations are based on the previously mentioned parameters of: the ideal lux 104; the maximum lux capacity of the light source 102; and the loss of lux 110 by the light source 102. In some embodiments, the lux adjustment algorithm 100 may be operated manually or through automated software.

In some embodiments, a Step 310 may include calculating, by the lux adjustment algorithm 100, a loss of lux 110 by the at least one light source 102 during a duration 108. The light source 102 comprises a light generating mechanism that generates the lux 106. Those skilled in the art will recognize that digital imaging projectors, such as the light source 102 decrease in image quality, especially brightness (lux 106), as the light generating mechanism degrades over a duration 108. The duration may include several years.

Thus, the lux adjustment algorithm 100 utilizes the calculated data from the anticipated loss of lux 110 to derive necessary increases in lux for of the light source 102. Those skilled in the art, in light of the present teachings, will recognize that laser phosphor projectors decrease in brightness (loss of lux 110) in a much slower and more uniform way than lamp based projectors.

A Step 312 includes calculating, by the lux adjustment algorithm 100, a required increase in lux 106 by the at least one light source 102 to compensate for the loss of lux 110 by the at least one light source 102, so as to maintain the lux 106 equal or greater than the ideal lux 104 during the duration 108. As the light generating mechanism becomes depleted over the duration 108, the amount of lux 106 required to maintain the ideal lux 104 increases. This compensatory increase in lux 106 is derived by the lux adjustment algorithm 100.

In one possible embodiment, the lux adjustment algorithm 100 can run on a computer which is network connected to the light source 102 and can control the light source 102 via the light source's 102 API to automatically make adjustments to the lux 106 generated by the light source 102 at exactly the right times without requiring manual knowledge or effort. In another exemplary use, the lux adjustment algorithm 100 operates using a calibration camera or camera(s) to take regular pictures of a final image, detect brightness falloff (lux 106 loss) over a duration 108, and control the light source 102 to increase the lux 106, brightness output to adjust for the lux 106 loss. In yet another embodiment, the lux adjustment algorithm 100 that is a licensed subcomponent of existing commercial projector management solutions, or running on a dedicated computer that is networked connected to the projectors.

A final Step 314 comprises incrementally increasing the lux 106 of the at least one light source 102 based on the calculations of the lux adjustment algorithm 100 until the maximum lux capacity of the at least one light source 102 is depleted to less than the ideal lux 104. The light generating mechanism may be manually or automatically operated for this purpose.

In one exemplary use of the method 300, a laser phosphor projector degrades from 100% to 50% brightness after 20,000 hours. If it is assumed, for example, use of the light source 102 at 8 hours per day, it may require 2500 days to lose 50% of the brightness (loss of lux 110). In other embodiments, a 1% loss of lux 110 occurs every 50 days. Thus, after 50 days the output of the light source 102 is at 99% of the initial maximum lux capacity. After 100 days the output of the light source 102 is at 98% of the initial maximum lux capacity.

However, if the light source 102 generates double the required ideal lux 104, on day 1 and is set to 50% capacity, then on day 50 when the light source's lux output decreases by 1%, the light source 102 can be reconfigured to project at 51% capacity, thus roughly nullifying the effect of the loss of lux 110.

Furthermore, when using laser phosphor projectors at 50% capacity, the degradation timeline increases according to the decrease in load. Thus, instead of 20,000 hours. 30,000 hours are required to reach 50% brightness, benefiting the overall timeline even more. Instead of the brightness degrading 1% every 50 days, it would degrade 1% every 75 days when operated at 50% capacity.

In another exemplary use, the method 300 may be operable with twice powerful light sources In the case of using twice powerful light sources (e.g. a 10,000 lumen projector when a 5,000 lumen image was required) 3,750 days are required before running out of available headroom (maximum lux capacity) within the light sources. At this point, the twice powerful light sources are operated at 100% capacity to produce the original ideal lux 104, which in this case is 5,000 lumens. It is significant to note that this calculation is not factoring in the curve resulting from speeding up the rate of degradation every time the projector output is increased.

Thus, continuing with the twice powerful light sources, during the first 3,750 days (10.2 years) the image would stay constant at an ideal lux 104 of 5,000 lumen brightness, except for the visually imperceptible degradation from 100% to 99% to 98% etc., taking place every 75 days. Then, when there is no more maximum lux 106 capacity left to utilize the twice powerful light sources, the normal process of loss of lux 110, resulting in visibly degrading brightness over time would occur and the final image would begin dropping from 5,000 lumens to 4950, 4900, etc.

It is significant to note that more than one light source 102 may be utilized to achieve the ideal lux 104. Thus, when using a single light source or a set of multiple light sources calibrated into a cohesive image, it is possible to use more light sources or brighter light sources than normally required and program all the light sources to operate at less than 100% capacity to achieve the ideal lux 104 in different combinations. This helps compensate for the loss of lux 110.

For example, if 5 light sources having a maximum lux capacity of 1,000 lumens (5×1,000) are normally utilized to create an ideal lux 104 of 5,000 lumens, it is possible to reconfigure this so as to utilize 10 light sources having a maximum lux capacity of 1,000 (10×1,000) with the 10 light sources operating at 50% of maximum capacity to create the same ideal lux 104 of 5,000 lumens produced by the 5 light sources. In another exemplary embodiment, instead of using a single 5,000 lumen light source, a single 10,000 lumen light source operating at 50% capacity could be used. Thus on a first day of operating the light source, at 50% capacity the ideal lux 104 for the image displays at 5,000 lumens.

Figure 4A:
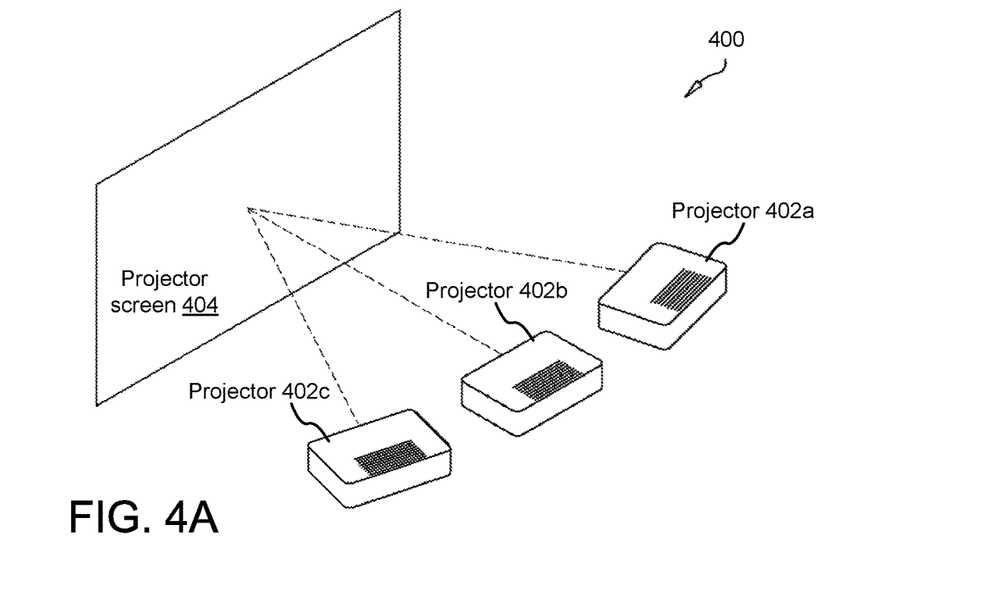
FIG. 4A is a rearward perspective view of a system for maintaining a light source at an ideal lux in accordance with the present invention.

FIG. 4A is a rearward perspective view of a system 400 for maintaining a light source at an ideal lux in accordance with the present invention.

Figure 4B:
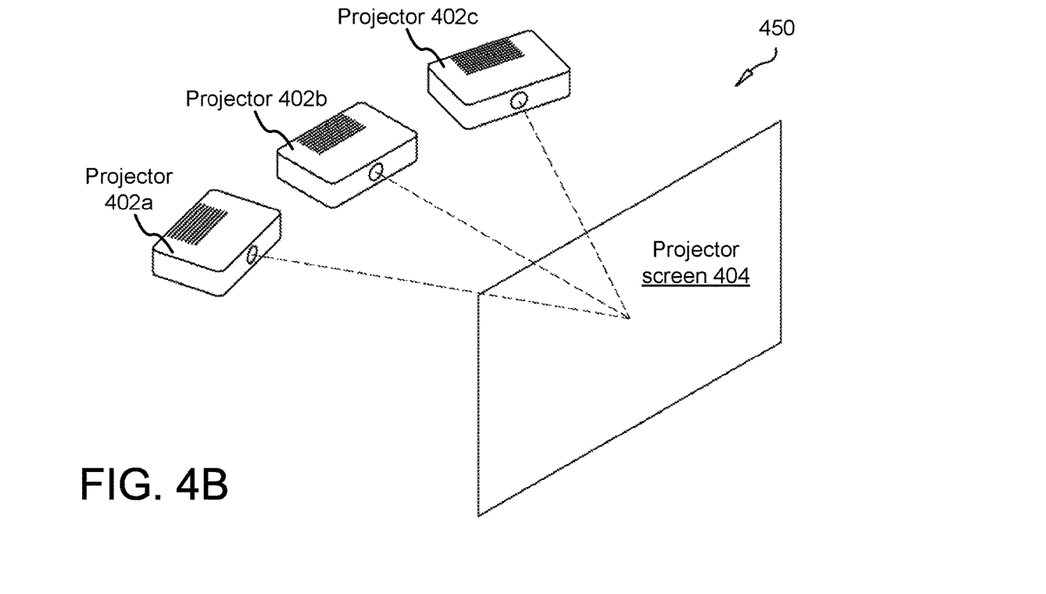
FIG. 4B is a rearward perspective view of a system for maintaining a light source at an ideal lux in accordance with the present invention.

In the shown example, there are three light sources each comprising a projector 402. Each projector 402 projects an identical image onto the projector screen 404 at less than full capacity. The images are all over overlaid, and the resulting image projected onto the projector screen 404 is achieved without running any projector at full capacity FIG. 4B is a rearward perspective view of a system 450 for maintaining a light source at an ideal lux in accordance with the present invention. As shown, the projectors 402 each project an identical image.

Figure 5:
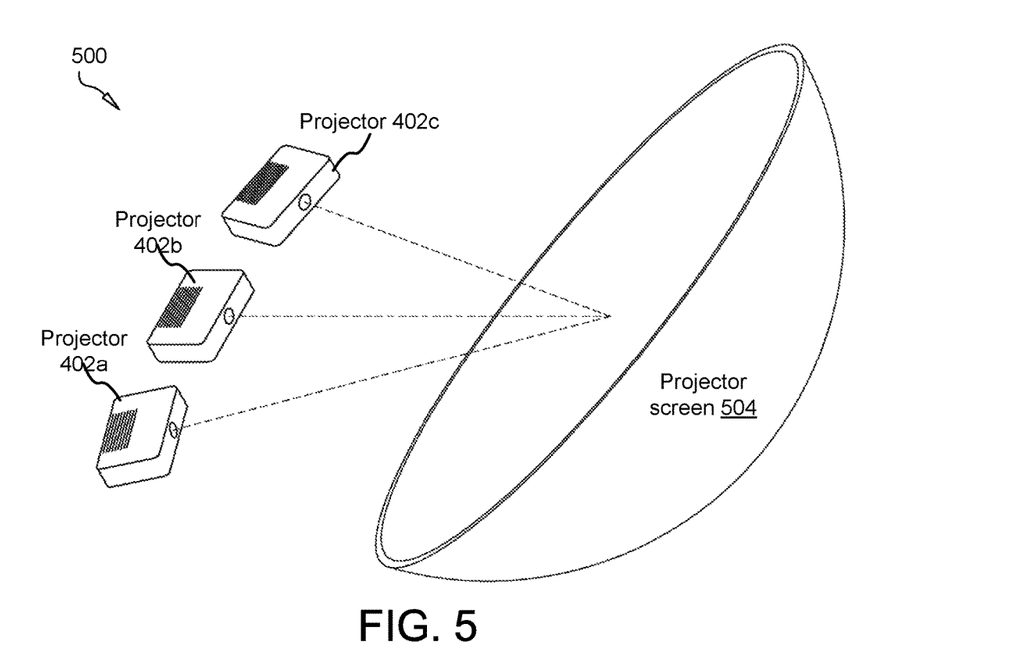
FIG. 5 is an elevational perspective view of a system for maintaining a light source at an ideal lux in accordance with the present invention.

FIG. 5 is an elevational perspective view of a system for maintaining a light source at an ideal lux in accordance with the present invention.

Each of the projectors 402a-c are configured/calibrated to project an image onto the projector screen 504. In the shown embodiment, the projector screen 504 is a dome. The projector screen 504 comprises, as shown, a concave dome within which the image is projected.

In various embodiments, each projector 402 project an identical image overlaid over other projected images. In other embodiments, the images projected by each projector 402 are partially overlaid to cover a predetermined interior surface of the dome 504.

Figure 6:
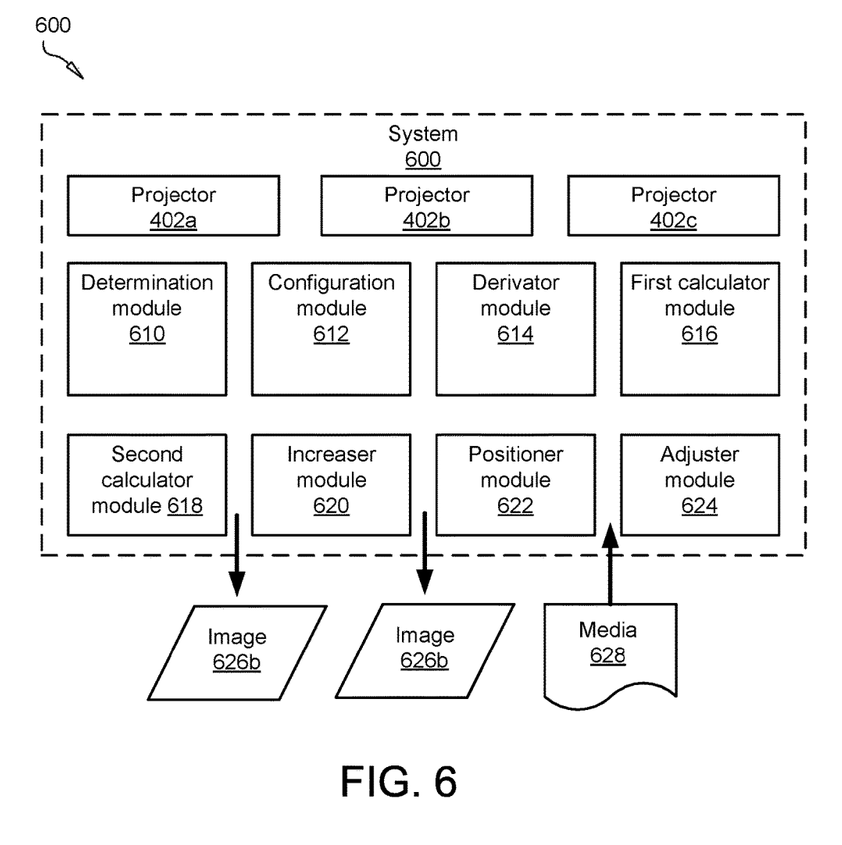
FIG. 6 is a block diagram of a system for maintaining a light source at an ideal lux in accordance with the present invention.

FIG. 6 is a block diagram of a system 600 for maintaining a light source at an ideal lux in accordance with the present invention.

Each of the modules in the system 600 are configured to functionally perform the steps of the method and system functions described above. Media 628 is input into the system 600, comprising in some embodiments, a computer readable file, including an image, video, audio, or text. The media 628 may comprise an interleaved computer-readable file, such as an MPEG or MP3 or MP4.

A plurality of images 626a-b are projected from the system 600 from projectors 402a-c.

The determination module 610 may be configured to determine an ideal lux for viewing an image. The configuration module 612 may be configured to configure the plurality of lights sources to generate a lux equal or greater than the ideal lux, whereby the light source comprises a maximum lux capacity that is greater than the ideal lux, whereby the maximum lux capacity is generally underutilized in relation to the ideal lux.

The derivator module 614 may be configured to derive a lux adjustment algorithm for operation of the at least one light source. The first calculator module 616 may be configured to calculate, by the lux adjustment algorithm, a loss of lux by the at least one light source during a duration.

The second calculator module 616 may be configured to calculate, by the lux adjustment algorithm, a required increase in lux by the at least one light source to compensate for the loss of lux by the at least one light source, so as to maintain the lux equal or greater than the ideal lux during the duration; and The increaser module 620 may be configured to incrementally increase the lux of the at least one light source based on the calculations of the lux adjustment algorithm until the maximum lux capacity of the at least one light source is depleted to less than the ideal lux.

The positioner module 622 may position the image 626 on the screen 404, and the adjuster module 624 may move the projectors 402 themselves on up to four axes. The increaser module 620 may increase or decrease the candlepower of bulbs in the projectors 402 in response to the brightness of an image 626 increasing or fading.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for maintaining a light source at an ideal lux, the system comprising:
a determination module configured to determine an ideal lux for viewing an image;
a plurality of projectors for providing a plurality of light sources;
a configuration module configured to configure the plurality of lights sources to generate a lux equal or greater than the ideal lux, whereby the light source comprises a maximum lux capacity that is greater than the ideal lux, whereby the maximum lux capacity is generally underutilized in relation to the ideal lux;
a derivator module configured to derive a lux adjustment algorithm for operation of the at least one light source, the lux adjustment algorithm derived using the following parameters:
anticipated loss of lux data for the at least one light source;
an ideal lux for the at least one light source;
maximum lux capacity of the at least one light source; and
loss of lux by the at least one light source over a period of time;
an increaser module configured to incrementally increase the lux of the at least one light source to compensate for the anticipated loss of lux from the light source until the maximum lux capacity of the at least one light source is depleted to less than the ideal lux.

* * * * *